Figure 1:
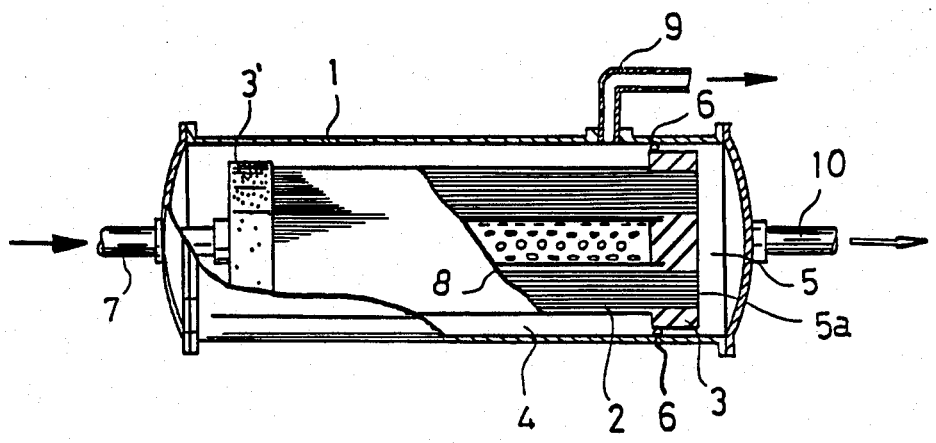

United States Patent [19]

Kuzumoto et al.

[11] Patent Number: 4,623,460

[45] Date of Patent: Nov. 18, 1986

[54] FLUID SEPARATION ELEMENT

[75] Inventors: Hideshi Kuzumoto; Tetsuo Ukai, both of Otsu; Akira Uejima, Yamatotakada, all of Japan

[73] Assignee: Toyo Boseki Kabushiki Kaisha, Osaka, Japan

[21] Appl. No.: 619,953

[22] Filed: Jun. 12, 1984

Related U.S. Application Data

[63] Continuation-in-part of Ser. No. 283,697, Jul. 15, 1981, abandoned.

[30] Foreign Application Priority Data

Jul. 15, 1980 [JP] Japan .................................. 55-97057

[51] Int. Cl.⁴ .............................................. B01D 13/00
[52] U.S. Cl. ................................ 210/321.1; 210/433.2
[58] Field of Search ...................... 264/135; 210/500.2, 210/321.1, 433.2

[56] References Cited

U.S. PATENT DOCUMENTS 3,734,989 5/1973 Leonard ............................ 210/500.2

*Primary Examiner*—Frank Spear
*Attorney, Agent, or Firm*—Jones, Tullar & Cooper

[57] ABSTRACT

A fluid separation element comprising a casing and a bundle of selectively permeable hollow fibers accommodated therein, the bundle being potted with a resinous potting agent at the end portions and the gaps among the hollow fibers being blocked with the resinous potting agent, characterized in that (1) the ratio of the porosity of the membrane of the hollow fiber at the effective permeation portion (HA) and the porosity of the membrane of the hollow fiber at the potting portion (HB) satisfies the following condition: $0.9 \geq HB/HA \geq 0.4$ and (2) the outer diameter of the hollow fiber at the effective permeation portion ($OD_A$) and the outer diameter of the follow fiber at the potting portion ($OD_B$) satisfies the following condition: $0.95 \geq OD_B/OD_A \geq 0.7$, whereby the firm potting between the hollow fibers and the resinous potting agent is achieved, and a good separation efficiency without the increase of a pressure loss can be maintained for a long period of time.

2 Claims, 1 Drawing Figure

FLUID SEPARATION ELEMENT

This is a continuation-in-part application of our copending application Ser. No. 283,697 filed on July 15, 1981, now abandoned.

The present invention relates to a fluid separation element. More particularly, it relates to an element for separation of a component from a fluid comprising the said component by the use of a selectively permeable membrane in a hollow fiber form.

For separation or concentration of a component in a fluid comprising the same, there are widely applied the principles of reverse osmosis and ultrafiltration. Since the fluid separation rate is proportional to the membrane area, it is important for accomplishment of efficient separation to make the membrane area per unit volume as large as possible. From this viewpoint, there has been developed a fluid separation element comprising a bundle of hollow fibers having selectively permeable membranes.

In general, a fluid separation element comprising a bundle of hollow fibers is constituted with a casing and said bundle of hollow fibers accommodated therein. The bundle is potted with a resinous potting agent at the end portions, and the gaps among the hollow fibers are blocked with the resinous potting agent. The resulting bundle is fixed in the casing, and the casing is divided into two sections.

Illustrating the fluid separation element of the invention with reference to the accompanying drawing, FIG. 1 shows a partially eliminated front view of the fluid separation element as an embodiment of the invention. In a casing 1, a bundle of hollow fibers of selective permeability 2 is accommodated. The bundle 2 is turned back in a U-letter shape, and the both end portions are potted with a resinous potting agent for fixation to make resin layers 3, 3', the gaps among the hollow fibers being simultaneously blocked with the resinous potting agent. The hollow fibers 2, on one side, penetrate the resin layer 3 to open at the opposite side and are, on the other side, turned back in the resin layer 3'. A pipe 8 having holes at the wall is present in the central portion of the bundle, and its one end is opened outside the casing 1 and the other end is closed. The resin layer 3 is fixed in the casing 1 with intervention of an O-ring 6 so that the inner space of the casing 1 is divided into an inner compartment 4 and an outer compartment 5.

The fluid to be treated comes from an inlet pipe 7 into the element and flows through the pipe 8. Then, the fluid comes out through the holes at the wall of the pipe 8, enters into the bundle, flows through the inner compartment 4 and is discharged from an outlet pipe 9. On the other hand, a certain component permeates through the membranes of the hollow fibers and flows in the hollow portions of the hollow fibers. Then, a fluid containing the component comes out from the open ends 5a of the hollow fibers and is collected at the outer compartment 5 and discharged through an outlet pipe 10.

In the fluid separation element having the above structure and being operated as above, the hollow fibers within the resin layers 3, 3' have some certain problems. Namely, the resin in the resin layers 3, 3' is emulsified or poorly cured in the presence of water so that the mechanical strength at the potting portion is lowered. On the other hand, the permeability of the hollow fibers is decreased in a dried condition, and the performance of the fluid separation element is lowered. Thus, it is extremely difficult to assure the firm potting of the hollow fibers without deterioration of the permeability of the hollow fibers.

Further, the membranes of the hollow fibers are generally constituted as a thin active layer with a sponge layer supporting the active layer thereon. Since the sponge layer has a great dimension difference between swelling and shrinkage according to the extent of wetting, separation at the interface between the hollow fibers and the resin often takes place and also cracks are frequently produced in the resin layer, whereby the operation of the fluid separation element is forced to stop.

A basic object of the present invention is to provide a fluid separation element wherein firm potting with a resinous potting agent is assured, and neither separation nor production of cracks occur in the resin layer.

According to this invention, there is provided a fluid separation element comprising a casing and a bundle of selectively permeable hollow fibers accommodated therein, the bundle being potted with a resinous potting agent at the end portions and the gaps among the hollow fibers being blocked with the resinous potting agent, characterized in that (1) the ratio of the porosity of the membrane of the hollow fiber at the effective permeation portion (HA) and the porosity of the membrane of the hollow fiber at the potting portion (HB) satisfies the following condition: $0.9 \geq HB/HA \geq 0.4$ and (2) the outer diameter of the hollow fiber at the effective permeation portion ($OD_A$) and the outer diameter of the hollow fiber at the potting portion ($OD_B$) satisfies the following condition: $0.95 \geq OD_B/OD_A \geq 0.7$.

The hollow fibers may be made of, for example, any of the following materials conventionally employed for preparation of ultrafiltration membrane, reverse osmosis membrane, etc: cellulose derivatives (e.g. ethyl cellulose, regenerated cellulose, cellulose diacetate, cellulose triacetate, cellulose butylate), homopolymers and copolymers of vinyl acetal, hydroxyethyl acrylate, hydroxyethyl methacrylate, acrylic acid, etc., polyester polyalkylene glycol copolymers, aromatic polyamides copolymerized with p-aminobenzoic acid hydrazide, isophthalic acid dihydrazide, terephthalic acid dihydrazide, phthalic acid dihydrazide or the like, aliphatic polyamides (e.g. nylon 4, nylon 6, nylon 66, polypiperazine adipamide), graft copolymers such as polyethylene glycol-grafted polyamide, high molecular electrolyte complexes such as polystyrenesulfonic acidpolyvinyl benzyltrimethyl ammonium, etc.

Usually, the hollow fibers used in the invention each have an outer diameter of 50 to 1000 microns, an inner diameter of 25 to 800 microns, a membrane thickness of 10 to 100 microns and a porosity of 35 to 80%.

The term "porosity (H %)" as herein used indicates a value measured by the following procedure. Namely, a hollow fiber yarn having a certain length (L cm) is cut in 2 cm lenghts. The cut pieces are enclosed in a cotton cloth, centrifuged with a centrifugal force of 500 g for 20 minutes and weighed (Wg). Then, these pieces are dried at 100° C. under 1 mmHg for 4 hours and weighed (Dg). From these measured weights, the water content and the porosity are calculated as follows:

$$\text{Water content (\%)} = \frac{Wg - Dg}{Wg} \times 100$$

$$\text{Porosity (\%)} = \frac{W_g \times \text{(water content)} \times 1/100}{\left\{\left(\frac{OD}{2}\right)^2 - \left(\frac{ID}{2}\right)^2\right\} \pi \cdot L} \times 100$$

wherein OD is the outer diameter of the hollow fiber and ID is the inner diameter of the hollow fiber, these diameters having been measured by the aid of a microscope.

As stated above, the hollow fiber of the invention is requried to satisfy the following condition:

$$0.9 \geq HB/HA \geq 0.4 \quad (1)$$

The above condition indicates that the porosity of the hollow fiber at the potting portion (HB) is appropriately smaller than the porosity of the hollow fiber at the effective permeation portion (HA). Particularly preferred is to satisfy the following condition:

$$0.8 \geq HB/HA \geq 0.5$$

When the HB/HA ratio is larger than 0.9, the water in the hollow fiber at the potting portion is discharged into the inner compartment on suspension of working or during treatment of water containing a high concentration of solute. As the result, the hollow fiber is shrunk on drying to produce separations and cracks at the interface between the hollow fiber and the potting resin. When the HB/HA ratio is smaller than 0.4, separation at the interface between the hollow fiber and the resin is produced due to swelling on working, whereby leakage is caused.

Further, the hollow fiber is required to satisfy the following relationship:

$$0.9 \geq OD_B/OD_A \geq 0.7 \quad (2)$$

Preferably, it satisfies the following relationship:

$$0.90 \geq OD_B/OD_A \geq 0.75$$

When the $OD_B/OD_A$ ratio is smaller than 0.7, the inner diameter of the hollow fiber becomes too small so that the pressure loss of the permeating water becomes larger and the performance of the fluid separation element is lowered. When the $OD_B/OD_A$ ratio is larger than 0.95, the gaps among the hollow fibers are too small so that the introduction of the potting resin into the gaps becomes difficult, whereby leakage is caused. Further, the potting at the potting interface is deteriorated, and cracks and separations are produced on the working.

The hollow fibers satisfying the said conditions can be obtained by drying the potting portion of the hollow fibers in the air or with hot air with a suitable control on the drying extent. The conditions for drying as particularly preferred are as follows: temperature of hot air, 90° to 110° C.; amount of hot air to be applied to hollow fiber, 2.5 to 10 m³/m² of outer surface area of hollow fibers. When drying is carried out under the above conditions, there is obtainable a fluid separation element having an excellent permeation performance.

As the potting resin, there is usually employed an epoxy resin. Other thermosetting or thermoplastic resins are also usable insofar as they have a satisfactory affinity to the material of which the hollow fibers are made.

By the use of the hollow fiber of the invention, neither cracks nor separations are produced at the potting portion of the hollow fibers. Further, the increase of pressure loss of the permeate fluid flow inside the hollow fibers can be prevented. Furthermore, the packing density of the hollow fibers at the potting portion is lowered by the decrease of the outer diameter of the hollow fibers, and therefore the potting resin can be effectively introduced into the gaps among the hollow fibers with ease so that the potting strength is increased. Thus, the hollow fibers are sufficiently potted, and the treatment capability is much increased.

The present invention will be illustrated more in detail by the following working example.

EXAMPLE 1

The potting portion of a bundle of hollow fibers made of cellulose triacetate, each fiber having an outer diameter of 160 microns, an inner diameter of 70 microns and a porosity of 52%, was dried with an amount of 3.1 m³ of hot forced air of 100° C. per m² of the outer surface area of the fiber to make an outer diameter of 130 microns, an inner diameter of 50 microns and a porosity of 36%, thus the HB/HA ratio and the $OD_B/OD_A$ ratio being respectively 0.69 and 0.81. The bundle was fixed in a casing by the use of a resinous potting agent (i.e. epoxy resin) to make a fluid separation element as shown in FIG. 1.

Using the separation element immediately after the preparation or after the exposure of the opening portion for a period of 6 months from the preparation, the salt elimination rate and the permeated amount of water were measured under the following conditions: 3.5% aqueous solution of sodium chloride; pressure, 55 kg/cm²; recovery, 30%; temperature, 25° C. The results are shown in Table 1.

TABLE 1

| | Salt elimination rate (%) | Permeated amount of water (m³/day) |
|---|---|---|
| Element immediately after preparation | 99.4 | 5.2 |
| Element after exposure in the air for 6 months | 99.4 | 4.9 |

From the above results, it is understood that even after exposure of the opening portion to the air over a long period of time, the separation between the hollow fiber and the potting resin and the crack in the potting layer are not produced. In the working state, the pressure loss is not increased and the separation efficiency is not lowered.

EXAMPLE 2

The potting portion of a bundle of hollow fibers made of cellulose triacetate, each fiber having an outer diameter of 220 microns and a porosity of 53%, was dried with an amount of 4.1 m³ of hot forced air of 100° C. per m² of the outer surface area of the fiber to make an outer diameter of 180 microns and a porosity of 38%, thus the HB/HA ratio and the $OD_B/OD_A$ ratio being respectively 0.72 and 0.82. The bundle was fixed in a casing by the use of a resinous potting agent (i.e. epoxy resin) to make a fluid separation element as shown in FIG. 1.

Using the separation element immediately after the preparation or after the exposure of the opening portion for a period of 6 months from the preparation, the salt elimination rate and the permeated amount of water were measured under the following conditions: 0.15% aqueous solution of sodium chloride; pressure, 30 kg/cm$^2$; recovery, 75%; temperature, 25° C. The results are shown in Table 2.

TABLE 2

| | Salt elimination rate (%) | Permeated amount of water (m$^3$/day) |
|---|---|---|
| Element immediately after preparation | 96.3 | 18 |
| Element after exposure in the air for 6 months | 96.4 | 16 |

From the above results, it is understood that even after exposure of the opening portion to the air over a long period of time, the separation between the hollow fiber and the potting resin and the crack in the potting layer are not produced. In the working state, the pressure loss is not increased and the separation efficiency is not lowered.

COMPARATIVE EXAMPLES 1 TO 3

Bundles of hollow fibers made of cellulose triacetate and having outer diameters and porosities as shown in Table 3 were dried with hot forced air under the conditions as shown in Table 3. With the resulting bundles, fluid separation elements were constructed as in Example 1.

Using the separation elements immediately after the preparation or after the exposure of the opening portion for a period of 1 month from the preparation, the salt elimination rate and the permeated amount of water were measured under the conditions as shown in Example 1. The results are shown in Table 3.

TABLE 3

| | Comparative Example 1 | Comparative Example 2 | Comparative Example 3 |
|---|---|---|---|
| Hollow fiber | | | |
| Outer diameter (u) | 160 | 160 | 220 |
| Porosity (%) | 52 | 52 | 53 |
| Drying conditions | | | |
| Temperature (°C.) | 100 | 75 | 100 |
| Amount of hot air (m$^3$/m$^2$) | 0.62 | 3.1 | 12.4 |
| Dried hollow fiber | | | |
| Outer diameter (u) | 157 | 154 | 132 |
| Porosity (%) | 48.4 | 47.8 | 18 |
| HB/HA | 0.93 | 0.92 | 0.34 |
| OD$_B$/OD$_A$ | 0.98 | 0.96 | 0.60 |
| Separation performance Immediately after preparation | | | |
| Salt elimination rate (%) | 98.2 | 98.6 | 95.2 |
| Permeated amount of water (m$^3$/m$^2$) | 6.4 | 5.8 | 12 |
| After exposure for 1 month | | | |
| Salt elimination rate (%) | 87.4 | 78.1 | — |
| Permeated amount of water (m$^3$/m$^2$) | 8.6 | 9.3 | — |
| State of bonded part | cracks produced | separation produced | — |

TABLE 3-continued

| | Comparative Example 1 | Comparative Example 2 | Comparative Example 3 |
|---|---|---|---|
| | at bonded part | between hollow fiber and bonded part | |

In Comparative Example 3, the permeated amount of water was decreased by 33% in comparison with that in Example 2. This is probably because the hollow fibers were excessively dried so that the inner diameter of each fiber was made too small and the pressure loss of the fluid flowing the inside of the fiber became great.

What is claimed is:
1. A fluid separation element, comprising:
a casing;
a bundle of selectively permeable hollow fibers accommodated therein, said fibers having been dried with hot air having a temperature of 90° to 100° C. and an amount of 2.5 to 10 m$^3$/m$^2$ of the outer surface of the hollow fiber; and
a resinous potting agent for potting the end portions of the fibers and blocking the gaps among the fibers, wherein:
the ratio of the porosity of the membrane of the hollow fiber at the effective permeation portion (HA) and the porosity of the membrane of the hollow fiber at the potting portion (HB) satisfies the following condition:

$0.9 \geq HB/HA \geq 0.4$;

and
the outer diameter of the hollow fiber at the effective permeated portion (OD$_A$) and the outer diameter of the hollow fiber at the potting portion (OD$_B$) satisfies the following condition:

$0.95 \geq OD_B/OD_A \geq 0.7$.

2. A method for forming a fluid separation element, comprising the steps of:
drying the end portions of a bundle of selectively permeable hollow fibers with hot air having a temperature of 90° and 100° C. and with an amount of hot air of 2.5 to 10 m$^3$/m$^2$ of the outer surface area of the hollow fiber; and
potting said dried end portion in a resinous potting agent to enhance the potting characteristics; wherein:
the fibers and drying conditions are selected such that at the completion of drying the ratio of the porosity of the membrane of the hollow fiber at the effective permeation portion (HA) and the porosity of the membrane of the hollow fiber at the potting portion (HB) satisfies the following condition:

$0.9 \geq HB/HA \geq 0.4$;

and the outer diameter of the hollow fiber at the effective permeation portion (OD$_A$) and the outer diameter of the hollow fiber at the potting portion (OD$_B$) satisfies the following condition:

$0.95 \geq OD_B/OD_A \geq 0.7$.

* * * * *